United States Patent
Chu

(10) Patent No.: US 10,183,764 B1
(45) Date of Patent: Jan. 22, 2019

(54) HIGH CAPACITY SPACECRAFT

(71) Applicant: Space Systems/Loral, LLC, Palo Alto, CA (US)

(72) Inventor: Peter Y. Chu, Palo Alto, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 426 days.

(21) Appl. No.: 14/939,445

(22) Filed: Nov. 12, 2015

(51) Int. Cl.
*B64G 1/44* (2006.01)
*B64G 1/10* (2006.01)
*B64G 1/40* (2006.01)

(52) U.S. Cl.
CPC ............ *B64G 1/1007* (2013.01); *B64G 1/40* (2013.01); *B64G 1/402* (2013.01); *B64G 1/443* (2013.01)

(58) Field of Classification Search
CPC .... B64G 2700/24; B64G 1/10; B64G 1/1007; B64G 2001/1092; B64G 1/443; B64G 1/407
See application file for complete search history.

(56) References Cited

U.S. PATENT DOCUMENTS

| | | | |
|---|---|---|---|
| 3,635,425 A * | 1/1972 | Swet | B64G 1/222 136/245 |
| 4,684,084 A | 8/1987 | Fuldner et al. | |
| 5,086,999 A * | 2/1992 | Mullen | B64G 1/12 244/159.4 |
| 5,199,672 A | 4/1993 | King et al. | |
| 5,411,226 A | 5/1995 | Jones et al. | |
| 5,870,063 A | 2/1999 | Cherrette et al. | |
| 6,016,999 A * | 1/2000 | Simpson | B64G 1/1007 244/159.5 |
| 6,037,909 A | 3/2000 | Cherrette | |
| 6,196,501 B1 | 3/2001 | Hall et al. | |
| 6,276,639 B1 | 8/2001 | Hornung et al. | |
| 6,296,206 B1 | 10/2001 | Chamness et al. | |
| 7,118,077 B1 | 10/2006 | Kistler et al. | |
| 7,832,687 B1 | 11/2010 | Das et al. | |

(Continued)

FOREIGN PATENT DOCUMENTS

| | | |
|---|---|---|
| EP | 1104743 | 6/2001 |
| FR | 2805245 | 8/2001 |
| WO | WO 92/00223 | 1/1992 |

OTHER PUBLICATIONS

International Search Report dated Feb. 20, 2015 in PCT/US2014/058302.

(Continued)

*Primary Examiner* — Brian M O'Hara
(74) *Attorney, Agent, or Firm* — Weaver Austin Villeneuve & Sampson LLP

(57) ABSTRACT

A spacecraft includes a first deployable module and a second deployable module and is reconfigurable from a launch configuration to an on-orbit configuration. In the launch configuration, the first deployable module is adjacent to the second deployable module. The first deployable module includes a first solar array, the first solar array being rotatable, in the on-orbit configuration, about a first axis of rotation, and the second deployable module includes a second solar array, the second solar array being rotatable, in the on-orbit configuration, about a second axis of rotation, the second axis of rotation being separated by a substantial distance from the second axis of rotation.

20 Claims, 10 Drawing Sheets

(56) References Cited

U.S. PATENT DOCUMENTS

| | | |
|---|---|---|
| 8,035,573 B2 | 10/2011 | Thompson et al. |
| 8,366,053 B2 | 2/2013 | Watts |
| 8,757,554 B1 | 6/2014 | Harvey et al. |
| 9,027,887 B2 * | 5/2015 | Polle ........................ B64G 1/26 244/158.6 |
| 9,242,743 B2 | 1/2016 | Chu |
| 2006/0038085 A1 | 2/2006 | Duden |
| 2012/0261515 A1 | 10/2012 | Smith et al. |
| 2014/0097981 A1 * | 4/2014 | Celerier ............... B64G 1/1007 342/352 |
| 2015/0028159 A1 | 1/2015 | Vichnin et al. |

OTHER PUBLICATIONS

Ariane Structure for Auxilliary Payload 5 User's Manual Space & Electronics Group, "Rapid Spacecraft Development Office, T 100 Spacecraft", NASA, TRW, OOS00993-1001 NT, 72 pages.
Notice of Allowance dated Oct. 5, 2015 in U.S. Appl. No. 14/108,213.
Office Action dated Apr. 13, 2015 in U.S. Appl. No. 14/108,213.

* cited by examiner

HIGH CAPACITY SPACECRAFT

TECHNICAL FIELD

This invention relates generally to a spacecraft, and more particularly to a high capacity spacecraft configured to include at least two large deployable modules, each of which includes a solar array having a respective axis of rotation, the axes of rotation being separated, in an on-orbit configuration, by a substantial distance.

BACKGROUND OF THE INVENTION

The assignee of the present invention designs and manufactures spacecraft for communications and broadcast services. Market demands for such spacecraft have imposed increasingly stringent requirements on spacecraft payload capacity. To meet these demands, higher power spacecraft with multiple antenna apertures and increased radiating surface area for heat dissipation are desirable.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with the mass and fairing envelope constraints of such launch vehicles as, for example, Ariane, Atlas, Proton, Falcon and Sea Launch.

Thus, there is a need for a high capacity spacecraft that is compatible with launch vehicle constraints.

SUMMARY

The present disclosure contemplates an improved configuration of spacecraft, having an increased payload capacity is as a result of at least two large deployable modules, each of which includes a solar array having a respective axis of rotation, the axes of rotation being separated, in an on-orbit configuration, by a substantial distance.

According to some implementations, a spacecraft includes a first deployable module and a second deployable module, the spacecraft being reconfigurable from a launch configuration to an on-orbit configuration. In the launch configuration, the first deployable module is adjacent to the second deployable module and includes a first solar array, the first solar array being rotatable, in the on-orbit configuration, about a first axis of rotation. The second deployable module includes a second solar array, the second solar array being rotatable, in the on-orbit configuration, about a second axis of rotation, the second axis of rotation being separated by a substantial distance from the first axis of rotation.

In some examples, the spacecraft may further include a central structural portion. In the launch configuration, both the first deployable module and the second deployable module may be disposed forward of the central structural portion. In the on orbit configuration, the central structural portion may be disposed approximately between the first deployable module and the second deployable module. In some examples, one or both of the first deployable module and the second deployable module may be hingedly coupled with the central structural portion. In some examples, one or both of the first deployable module and the second deployable module may be slidably coupled with the central structural portion.

In some examples, a transition between the launch configuration and the on orbit configuration may include a rotary motion of one or both of the first deployable module and the second deployable module.

In some examples, a transition between the launch configuration and the on orbit configuration may include a linear motion of one or both of the first deployable module and the second deployable module.

In some examples, reconfiguring from the launch configuration to the on-orbit configuration may include imparting relative motion to the first deployable module and the second deployable module, an initial direction of the relative motion being substantially orthogonal to adjacent surfaces of the first deployable module and the second deployable module.

In some examples, reconfiguring from the launch configuration to the on-orbit configuration may include imparting a relative motion to the first deployable module and the second deployable module, an initial direction of the relative motion being substantially parallel to adjacent surfaces of the first deployable module and the second deployable module.

In some examples, with respect to an orbit plane, in the on orbit configuration, the spacecraft may have a yaw axis within the orbital plane and directed from a spacecraft coordinate system origin toward nadir, a pitch axis orthogonal to the orbit plane and passing through the spacecraft coordinate system origin, and a roll axis orthogonal to the pitch axis and the yaw axis and passing through the spacecraft coordinate system origin. Reconfiguring from the launch configuration to the on-orbit configuration may include imparting relative motion to the first deployable module and the second deployable module whereby an effective length of the spacecraft along the roll axis is increased. In some examples, at least one of the first deployable module and the second deployable module may include a first sidewall area and a third sidewall area substantially disposed, in the on-orbit configuration, orthogonal to the pitch axis and facing toward opposite directions, and a second sidewall area and a fourth sidewall area substantially disposed, in the on-orbit configuration, respectively, orthogonal to the roll axis. A first combined area of the first sidewall area and the third sidewall area may be substantially larger than a second combined area of the second sidewall area and the fourth sidewall area. In some examples, the first combined area is at least two times as large as the second combined area.

In some examples, each of the first deployable module and the second deployable module includes a respective payload element.

In some examples, at least a portion of each the first deployable module and the second deployable module may have a substantially 'U' shaped configuration, including a central recess, and two outboard segments. At least one outboard segment of the first deployable module may be disposed, in the launch configuration, within the central recess of the second deployable module.

In some examples, the spacecraft may include an aft surface including a launch vehicle adapter. In the on orbit configuration, the spacecraft may be disposed with the aft surface and at least one payload element disposed, so as to be Earth facing.

In some examples, the spacecraft may include an aft surface including a launch vehicle adapter. In the on orbit configuration, the spacecraft is disposed such that a normal to the aft surface is substantially parallel to the first axis of rotation.

In some examples, pressure due to solar radiation impingement on first deployable module and the second deployable module results in approximately balanced solar torque.

In some examples, the spacecraft may further include at least one thruster. The spacecraft has a center of mass and the at least one first thruster may be configured to produce a thrust vector passing through or proximate to the center of mass, the thrust vector being approximately parallel to the first axis of rotation.

In some examples, the spacecraft may further include a thruster support mechanism (TSM) with one or more degrees-of-freedom. The TSM may be articulable over a range of positions and orientations such that the at least one thruster may be selectably disposed so as to impart to the spacecraft a velocity change, a torque, or both for a selected one or both of orbit control and momentum management.

In some examples, the spacecraft may further include a launch vehicle adapter. The first deployable module may include a first portion of the launch vehicle adapter, and the second deployable module may include a second portion of the launch vehicle adapter.

In some examples, in the on-orbit configuration, the first deployable module and the second deployable module are non-abutting.

BRIEF DESCRIPTION OF THE DRAWINGS

Features of the invention are more fully disclosed in the following detailed description of the preferred embodiments, reference being had to the accompanying drawings, in which:

FIGS. 9A-9E illustrate examples of implementing electric thrusters onto spacecraft according to some implementations.

Figure 1:
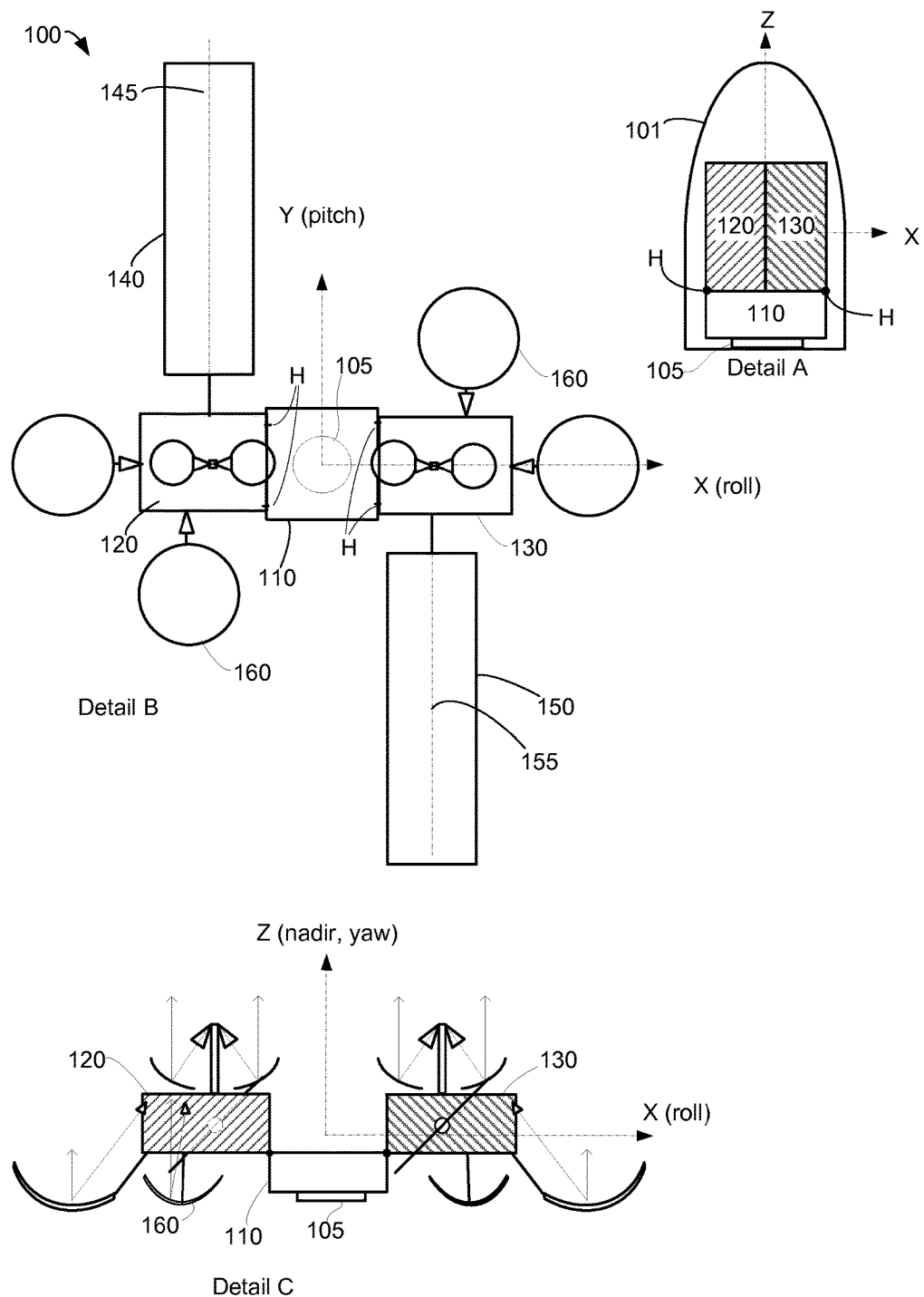
FIG. 1 illustrates a spacecraft according to an implementation.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The present inventor has appreciated that a high capacity spacecraft may advantageously be arranged to include an optional central structural portion and at least two deployable modules. In an example implementation, referring now to FIG. 1, a spacecraft 100 may include a central structural portion 110, a first deployable module 120 and a second deployable module 130. The central structural portion 110 may include a launch vehicle adapter 105 proximate to an aft surface of the central structural portion 110. The spacecraft 100 may be reconfigurable from a launch configuration (illustrated in Detail A) to an on-orbit configuration (illustrated in Detail B and Detail C).

In the launch configuration, the first deployable module 120 is adjacent or proximate to the second deployable module 130 and both the first deployable module 120 and the second deployable module 130 are disposed forward of the central structural portion 110 within a launch vehicle fairing 101.

In the on-orbit configuration, with respect to an orbit plane, the spacecraft has a yaw axis within the orbital plane and directed from a spacecraft coordinate system origin toward nadir (e.g., the center of Earth), a pitch axis orthogonal to the orbit plane and passing through the spacecraft coordinate system origin, and a roll axis orthogonal to the pitch axis and the yaw axis and passing through the spacecraft coordinate system origin. The first deployable module 120 is separated from the second deployable module 130 by the central structural portion 110, which is disposed therebetween. Each of the deployable module 120 and the deployable module 130 includes a respective solar array. In the illustrated implementation, the first deployable module 120 includes a first solar array 140 and the second deployable module 130 includes a second solar array 150. In the on-orbit configuration, each respective solar array is rotatable about a respective axis of rotation. In the illustrated implementation, the first solar array 140 is rotatable about a first axis of rotation 145 and the second solar array 150 is rotatable about a second axis of rotation 155, both the first axis of rotation 145 and the second axis of rotation 155 being substantially parallel to the pitch axis. It may be observed that the first axis of rotation 145 is separated by a substantial distance from the second axis of rotation 155.

The presently disclosed techniques contemplate a spacecraft that is configured to include two large deployable modules. "Large", as used herein, means that, with respect to a total volume of the spacecraft, each deployable module has a volume of at least 30% of the total volume. Each deployable module may have a payload mounting area, solar power generation area, thermal radiator area and Earth pointing antenna reflector aperture area that is substantially similar to a conventional single-body satellite while the spacecraft, including the two large deployable modules and optional central structural portion, is still configured to be compatible compatibility with conventional launch vehicles. Compared to a conventional single-body spacecraft configuration, a near doubling of payload mounting area, thermal dissipation surface area, and/or solar array deployed surface area is enabled by the presently disclosed techniques. In addition, the disclosed techniques provide a significant increase in the amount of Earth facing antenna aperture field of view, in the on-orbit configuration, as a result of extending an effective length along the roll (X) axis. In the illustrated implementation, respective aspect ratios of the deployable module 120, the deployable module 130, and the central structural portion 110 are selected to further increase the effective length of the spacecraft along the roll axis in the on-orbit configuration. More particularly, in the on orbit configuration, an aspect ratio of length in the X direction to length in either the Z direction (towards Earth) or in the Y direction (orthogonal to orbit) is substantially greater than one. In addition, in the on-orbit configuration a substantially larger surface area may be oriented north-south (i.e., orthogonal to the pitch axis) than the surface area that is oriented east-west (i.e., orthogonal to the roll axis). For example, in some implementations the aspect ratio may be at least 1.3. In some implementations the aspect ratio may be greater than 2.

By providing a large separation between the axes of rotation 145 and 155, additional reflectors 160 may be accommodated and thruster plume impingement on solar array wings and other deployed appendages may be significantly reduced as compared to a conventional spacecraft.

In some implementations, each deployable module may have one or more dedicated solar wings and any number of deployable and/or fixed antenna reflectors. Advantageously, each deployable module presents a sun-facing surface area, including solar wings and antenna reflectors, such that pressure due to solar radiation impingement on the respective modules result in roughly balanced solar torque. In a launch configuration, adjacent surfaces of the first deployable module and the second deployable module may be abutting or may be disposed in a non-abutting arrangement with a gap between the adjacent surfaces. The solar arrays may be configured as a plurality of flat rigid panels that are reconfigured from a launch configuration to an on-orbit configuration by unfolding across one or more hinge lines. Alternatively, one or more of the solar arrays may be flexible or semi-rigid "roll-up" type solar panels. Other solar arrays such as bi-fold arrays or "window blind" arrays, or a mix of different types, are also within the contemplation of the present disclosure. Batteries may be disposed in the central structural portion 110, and/or in one or both of the first deployable module 120 and the second deployable module 130. Power generation, storage, consumption, and dissipation may primarily be handled and balanced within each module, while cables, waveguides, heat pipes, propulsion lines, etc. may connect the modules with each other and the central structural portion 110 and provide for signal, resource and load balancing, powering the equipment in the central structural portion 110, and/or cross strapping.

Conventional thrusters may be implemented on the deployable modules and/or the central portion 110. Advantageously, an implementation may include only high specific impulse electric thrusters, thereby minimizing propellant tank size and propellant mass. In some implementations, electric thrusters and associated propellant tanks are located exclusively on the central structural portion 110. In other implementations, at least some of the electric thrusters and tanks are located in one or both of the first deployable module 120 and the second deployable module 130.

The central structural portion 110 may include a launch vehicle interface. Attitude control equipment and spacecraft control electronics may be included in at least one of the central structural portion 110, the first deployable module 120, and the second deployable module 130.

In the configuration illustrated in FIG. 1, the first deployable module 120 and the second deployable module 130 may be hingedly coupled with the central structural portion 110. In the illustrated implementation, the deployable modules, when being transitioned from the launch configuration to the on-orbit configuration, may be said to rotate "open" in a clamshell-like manner by way of motors or passive means. More particularly, in the illustrated implementation, in the launch configuration, adjacent surfaces of the first deployable module 120 and the second deployable module 130 are orthogonal to the direction of initial rotary motion during reconfiguration from the launch configuration to the on orbit configuration.

In the illustrated implementation, the spacecraft may be reconfigured from the launch configuration to the on orbit configuration by rotating the first deployable module 120 and the second deployable module 130 about respective hinges 'H', simultaneously or sequentially. However, in some implementations, the first deployable module and the second deployable module may be slidably disposed (not illustrated) with respect to the central structural portion 110 such that a transition between the launch configuration and the on-orbit configuration includes a linear motion of one or both of the first deployable module and the second deployable module is with respect to the central structural portion 110. Linear motion may be implemented by a variety of methods such as slider, roller rail, astromast, bi-stable tape springs, or other elastic memory materials.

Figure 2:
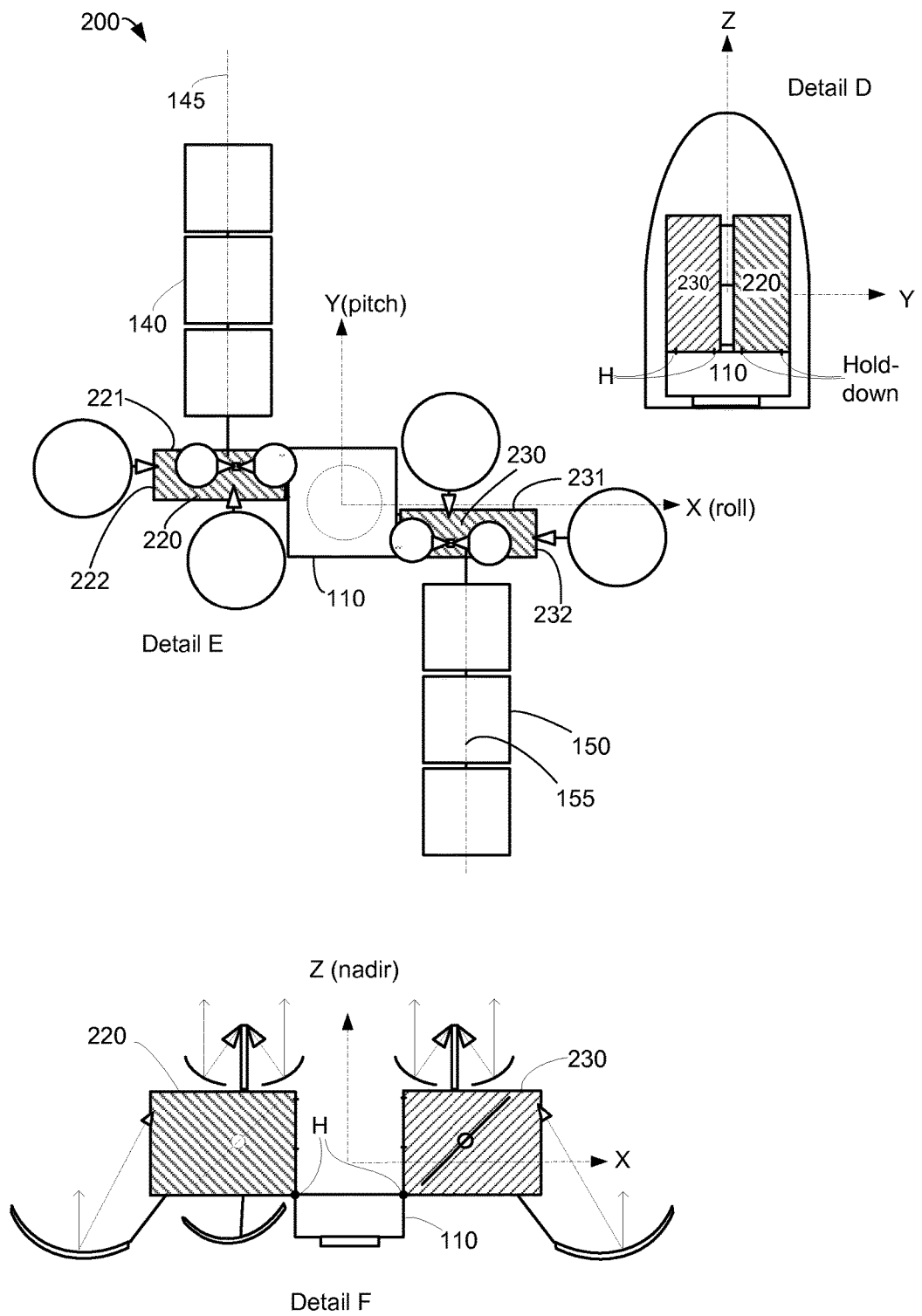
FIG. 2 illustrates a spacecraft according to another implementation.

Other implementations are within the contemplation of the present disclosure. For example, referring now to FIG. 2, a further configuration is illustrated wherein, in the launch configuration (Detail D), adjacent surfaces of a first payload module 220 and a second payload module 230 are parallel to the direction of motion during transition from the launch configuration to the on orbit configuration. As a result, the deployable modules, when being transitioned from the launch configuration to the on orbit configuration (Detail E and Detail F), may be said to open in a scissors-like manner. Comparing FIG. 1 and FIG. 2, it may be appreciated that the arrangement illustrated in FIG. 2 provides an increased surface area for spacecraft sidewalls orthogonal to the pitch axis (i.e., side walls 221 and 231), and a decreased surface area for spacecraft sidewalls orthogonal to the roll axis (i.e., side walls 222 and 232) and a decreased surface area for spacecraft sidewalls orthogonal to the yaw axis (hashed surfaces in Detail E).

This may be advantageous, because for a spacecraft intended to be operated in a near-equatorial orbit such as a geosynchronous orbit, the side walls 221 and 231 are north or south panels of the spacecraft and experience a solar radiation exposure that is relatively benign and stable compared to the side walls 222 and 232 which are east/west panels and therefore experience significant diurnal cycles of solar radiation loads as the spacecraft orbits the Earth. Because operating internal payload elements and bus equipment dissipate heat and may be damaged by excessive temperature, such equipment is preferably mounted on a north or south panel. As a result, a larger aspect ratio of north-south panel area to east-west panel area is preferable for purposes of maximizing equipment mounting area availability on a north/south panel for favorable radiative heat dissipation to cold space. Advantageously, the presently disclosed techniques permit a substantially larger surface area to be oriented north-south (i.e., orthogonal to the pitch axis) than a surface area oriented east-west (i.e., orthogonal to the roll axis) while respecting the interface constraints of a conventional launch vehicle fairing. For example, in some implementations the aspect ratio may be at least 1.3. In some implementations the aspect ratio may be greater than 2.

In the illustrated implementation, the spacecraft may be reconfigured from the launch configuration to the on orbit configuration by rotating the first deployable module 220 and the second deployable module 230 about respective hinges 'H'. However, in some implementations, the first deployable module and the second deployable module may be slidably disposed with respect to the structural module 110 such that a transition between the launch configuration and the on-orbit configuration includes a linear motion of one or both of the first deployable module and the second deployable module is with respect to the central structural portion 110.

Figure 3:
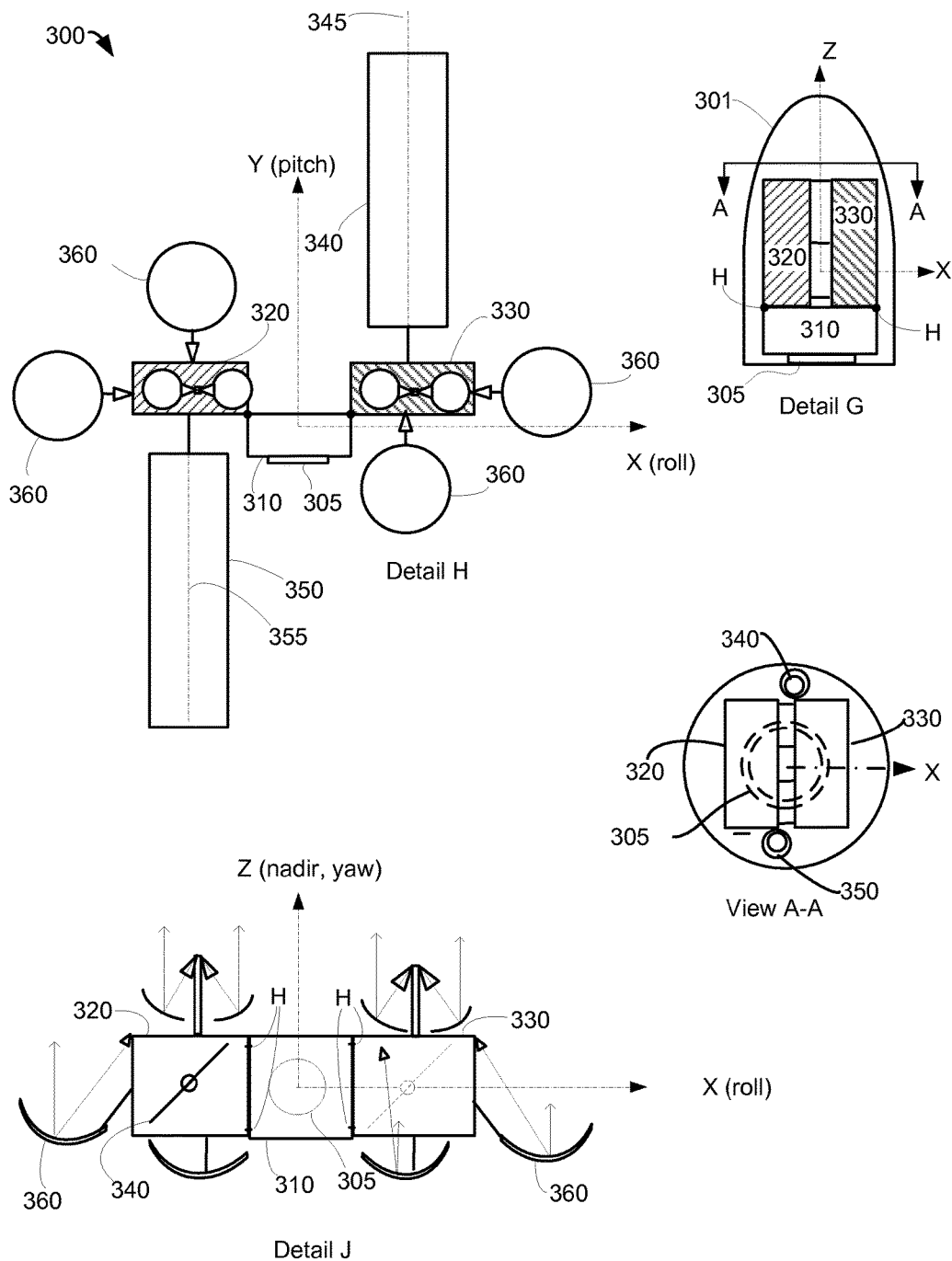
FIG. 3 illustrates a spacecraft according to further implementation.

Referring now to FIG. 3, a further configuration is illustrated wherein the deployable modules, when being transitioned from the launch configuration (Detail G) to the on orbit configuration (Detail H), rotate about respective axes of rotation that are substantially parallel to the yaw (Z) axis. It should be noted that in the arrangement illustrated in FIG. 3, Details H and J, an aft surface of the spacecraft, including launch vehicle adapter 305, is orthogonal to the pitch axis, whereas in the arrangements illustrated in FIG. 1, Details B and C, and FIG. 2, Details E and F, the aft surface of the spacecraft is orthogonal to the yaw axis.

Figure 4:
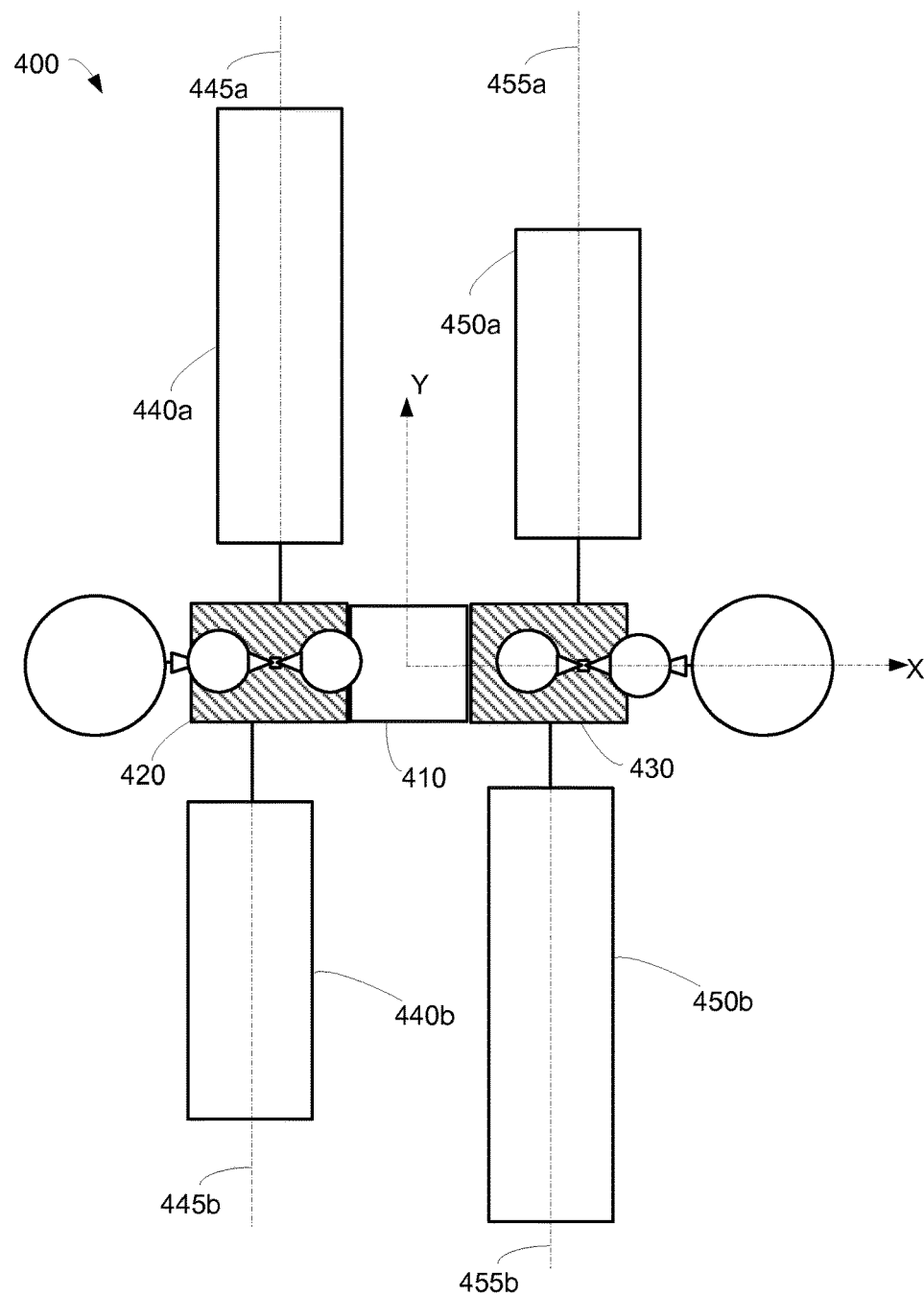
FIG. 4 illustrates a spacecraft in the on orbit configuration according to an implementation.

Referring now to FIG. 4, in some implementations each of a first deployable module 420 and a second deployable module 430 of spacecraft 400 may include a pair of solar arrays. In the illustrated implementation for example, the first deployable module 420 is coupled with solar arrays 440*a* and 440*b*, which may each be configured to rotate about a respective axis of rotation 445*a* and 445*b*. Similarly, the second deployable module 430 is shown as being coupled with solar arrays 450*a* and 450*b*, which may each be configured to rotate about a respective axis of rotation 455*a* and 455*b*. Twice a day there may be a short period of shadow cast from a solar array on a solar array of the other module; a resulting impact on power can be handled by batteries. The axes of rotation 445*a* and 445*b* may be respectively co-aligned, and likewise the axes of rotation 455*a* and 455*b* may be respectively co-aligned, but this is not necessarily so. As shown in FIG. 4, it may be contemplated that solar arrays on each module do not rotate about a respective co-aligned axis. The distance between the axis 445*a* and the axis 455*a* must allow free rotation of the solar arrays 445*a* and 455*a*, and likewise for the axis 445*b* and the axis 455*b*. Moreover, the respective solar arrays need not have similar surface areas. Each deployable module presents a sun-facing surface area, including solar wings and antenna reflectors, such that pressure due to solar radiation impingement on the respective modules advantageously results in roughly balanced solar torque.

Such design freedoms, not practical in a conventional spacecraft, may allow further optimization of various practical issues such as field of view of payload elements, horn placement relative to transponder boxes in the module, antenna deployment sequence, thruster impingement, etc. While the configuration illustrated in FIG. 4 is similar, except for the number of solar arrays, to the configuration illustrated in FIG. 1, the configurations illustrated in other figures similarly can also have additional solar arrays. In addition, configuration such as 3 solar arrays on a spacecraft is also possible (not illustrated), with or without a large deployable antenna in place of the $4^{th}$ solar array to balance solar torques.

Figure 5:
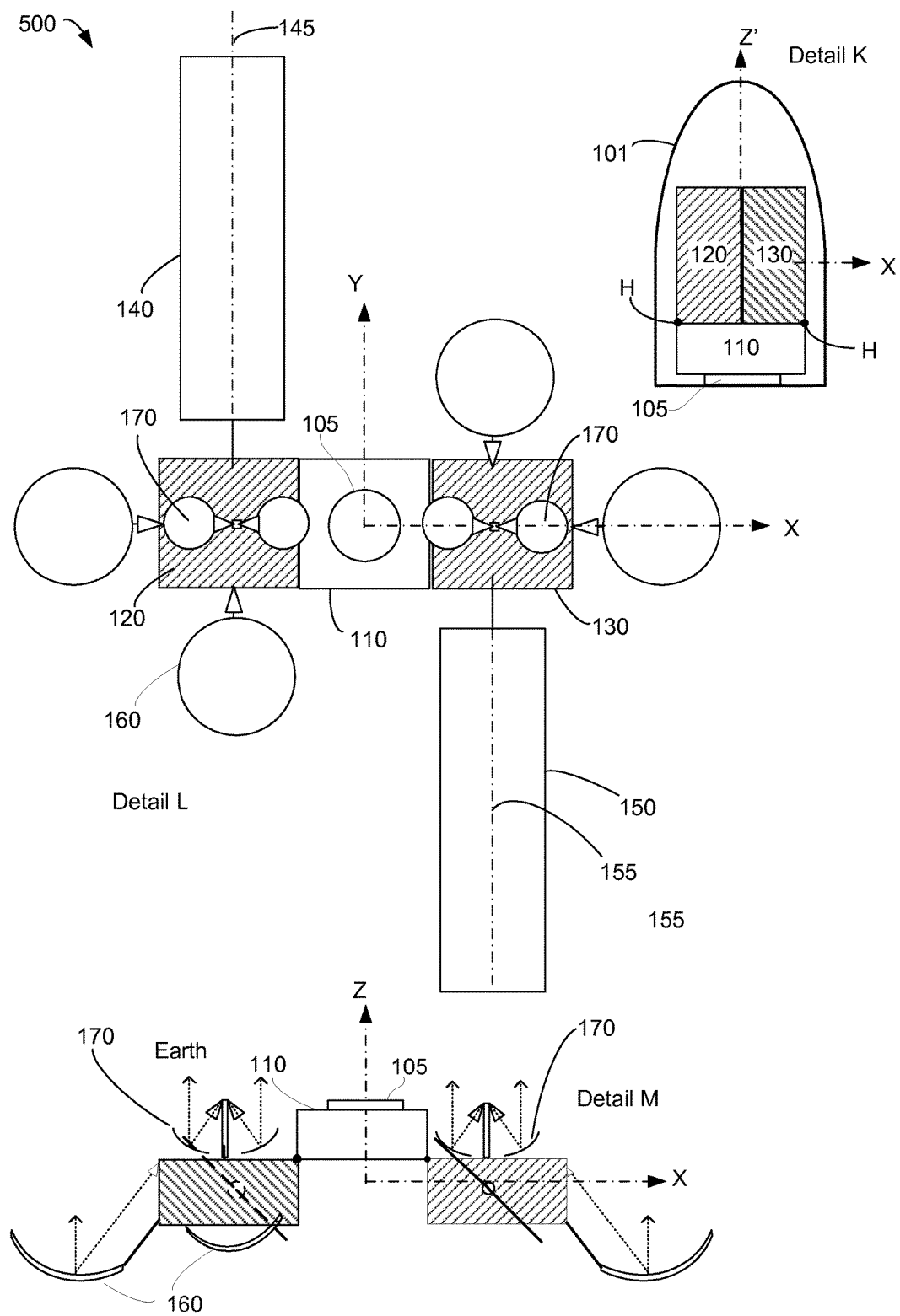
FIG. 5 illustrates a spacecraft according to a yet further implementation.

Referring now to FIG. 5, in some implementations reconfiguring a spacecraft 500 from a launch configuration (Detail K) to an on orbit configuration (Detail L and Detail M) include operating a spacecraft in an "inverted" configuration. In the inverted configuration, payload elements 160 are Earth facing notwithstanding that an aft surface of the spacecraft 500, including the launch vehicle adapter 105, is also Earth facing. This configuration may be advantageous, because reflectors 170 may be stowed in the gap between the launch vehicle fairing and the modules in the launch configuration. Although in the illustrated configuration the payload elements are depicted as antenna reflectors, it should be noted that the term payload element as used herein includes imaging and navigation payload components, as well as any type of communication payload component. The configuration shown in FIG. 2 can also be inverted (not illustrated).

Figure 6:
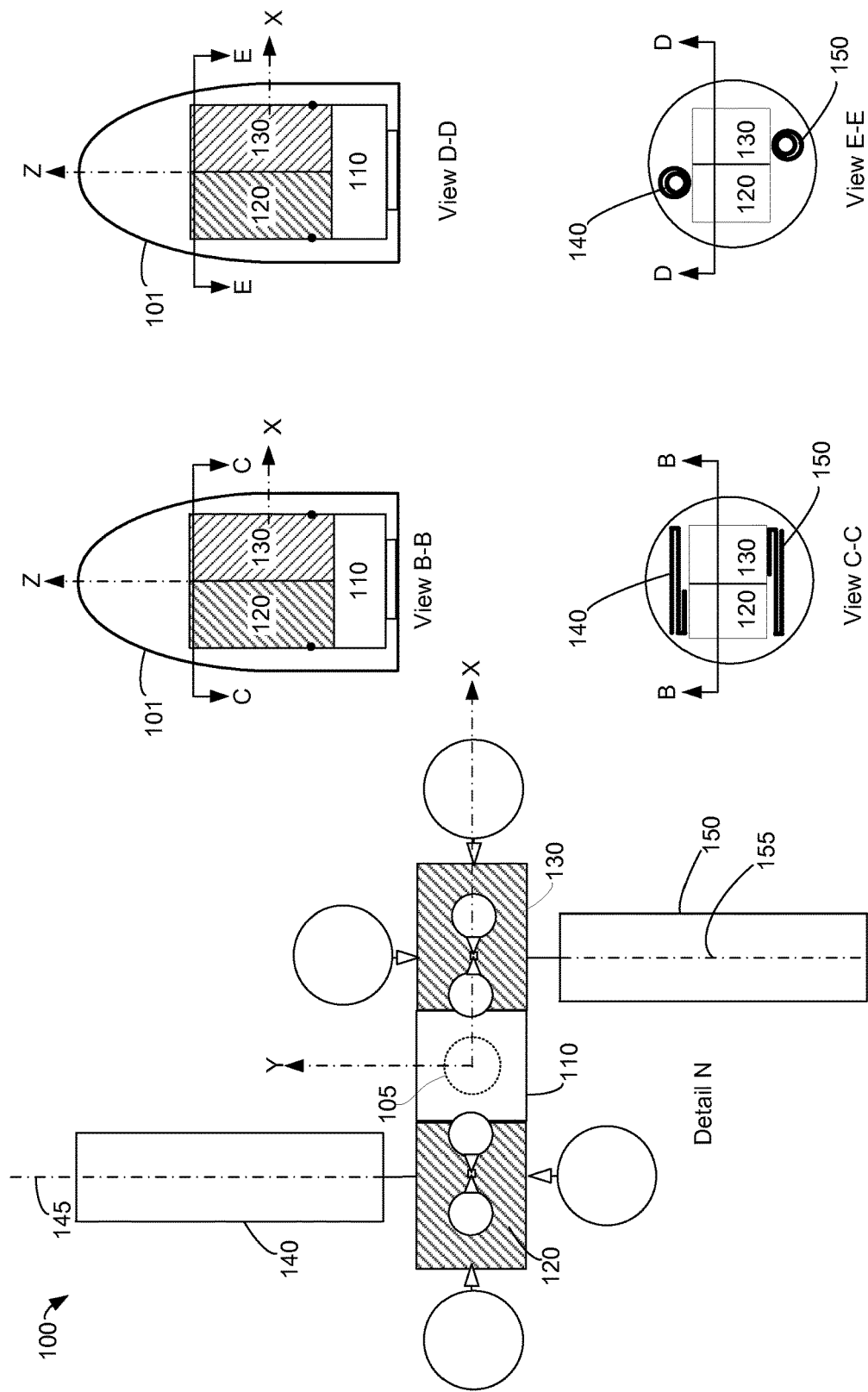
FIG. 6 illustrates a spacecraft according to two further implementations.

With regard to each of the above described implementations, it will be appreciated that one or both of the solar array 140 and the solar array 150 may be configured as a plurality of flat rigid panels that are reconfigured from a launch configuration to an on orbit configuration by unfolding across one or more hinge lines. Alternatively, one or both of the solar array 140 and the solar array 150 may be "roll-up" type solar panels. In FIG. 6, which illustrates in Detail N an example spacecraft 100 in the on orbit configuration, views B-B and view C-C show the spacecraft in an example launch configuration in an implementation where the solar array 140 and the solar array 150 are each configured as a plurality of flat rigid panels. Views D-D and E-E, on the other hand, show an example launch configuration where the solar array 140 and the solar array 150 are each configured as roll-up type solar panels. If the orbit is geo stationary, the solar array axes are along the north-south direction, In other orbits, sun angle and relation to the Earth may lead to other orientations and even more than 1-degree-of-freedom rotational mechanisms for rotating the solar wings over an orbit revolution. Depending on the stowage configuration, the solar arrays may need more than one degree-of-freedom at the base for deployment.

Figure 7:
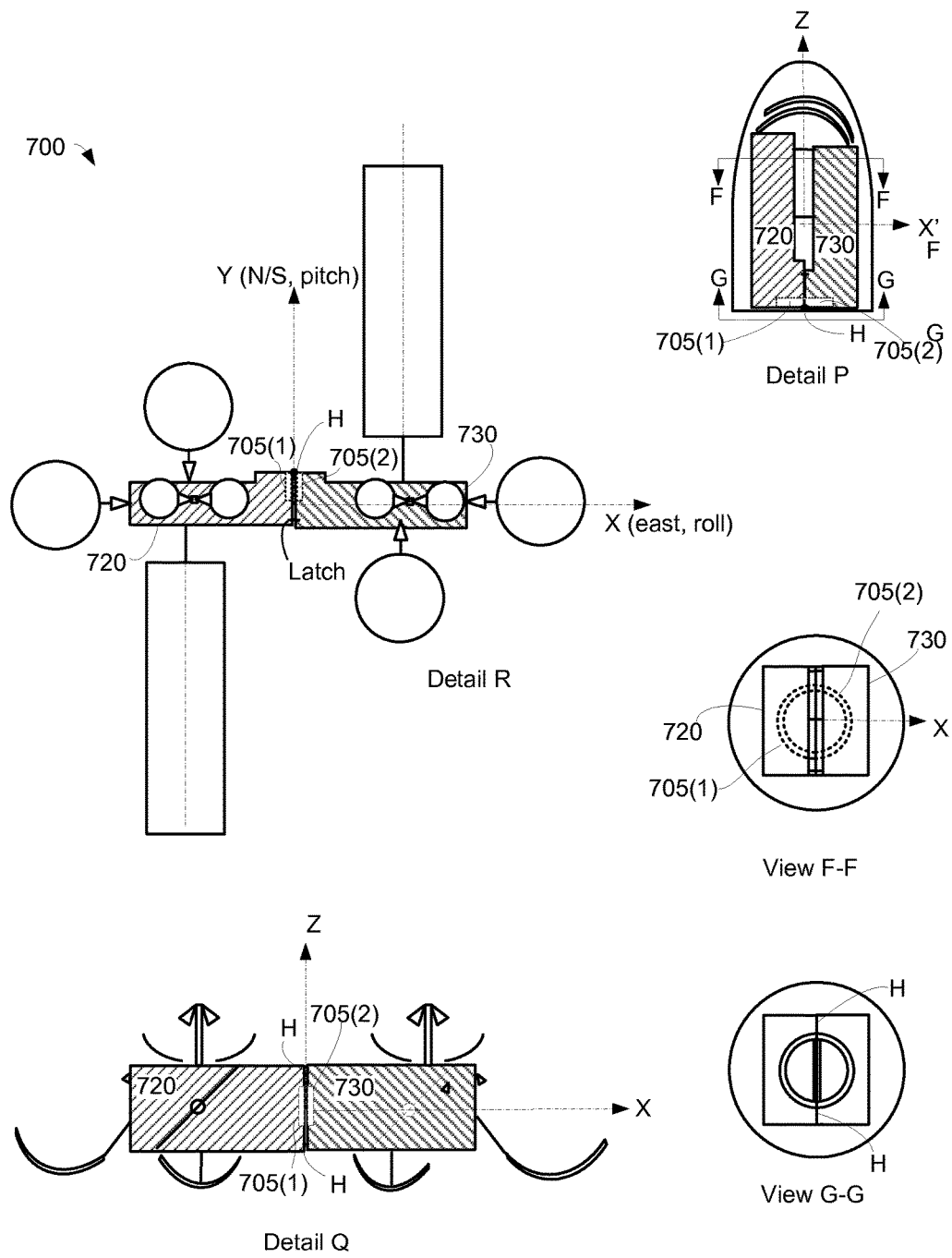
FIG. 7 illustrates a spacecraft according to another implementation.

Referring now to FIG. 7, an implementation is illustrated in which a central structural portion is very small or completely omitted. Instead, spacecraft 700 includes a deployable module 720 and a deployable module 730 each of which has a direct interface with a launch vehicle by way of a respective portion of launch vehicle adapter 705. For example, in the illustrated implementation, the deployable module 720 includes a substantially semicircular adapter structure 705(1); similarly, the deployable module 730 includes a substantially semicircular adapter structure 705(2). Adapter structures 705(1) and 705(2) may have the same radius, which, advantageously may correspond to a radius of a launch vehicle's payload adapter interface ring. In some implementations, one or both of adapter structures 705(1) and 705(2) may be configured as an open 'C' shaped structure. In some implementations, one or both of adapter structures 705(1) and 705(2) may be configured as a closed, 'D' shaped structure. The two semicircular halves are tied together in the launch configuration by hold-downs (not illustrated) which are released during or after the spacecraft separation from the launch vehicle, and not to be confused with hinges "H". In either configuration, a hinged arrangement "H" may be contemplated about which the respective deployable module 720 and 730 rotate when transitioning between the launch configuration and the on orbit configuration. Various hold-downs tie the two modules to each other in the launch configuration and are released before module deployment. The hinge axis may be below the LV interface plane for better clearance during deployment of the two modules relative to each other. Deployment motion around the hinge axis may be driven by motors or passively, and latches may be used to secure the configuration after deployment. Alternatively (not illustrated), hinge(s) "H" may be supplemented or replaced by one or more separation mechanism by which the two deployable modules are displaced relative to each other. In the deployed configuration the deployable modules 720 and 730 are not necessarily abutting each other. Whether or not the deployable modules 720 and 730 are abutting each other, provisions may be made for electrical cables and the like to pass between the deployable modules 720 and 730 so as to allow signals, power, etc, to flow between the two modules.

The implementation of FIG. 7 may be referred to as a side-by-side arrangement of respective deployable modules. In some implementations of such a side-by-side arrangement, or other implementations described herein, one or more techniques disclosed in US Patent Publication No. US-2015-0102174, assigned to the assignee of the present application and hereby incorporated into the present application in its entirety, may be implemented.

Figure 8:
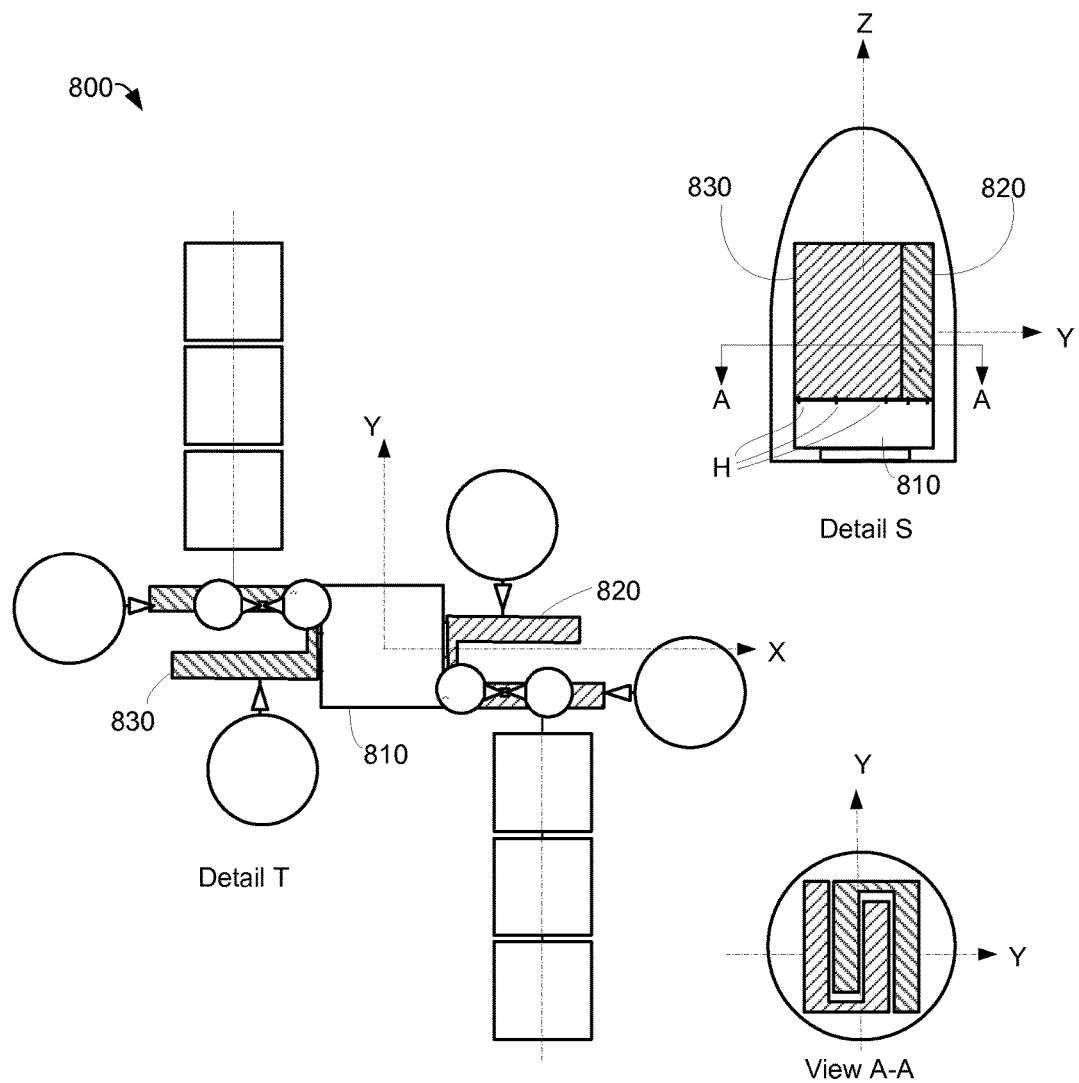
FIG. 8 illustrates a spacecraft according to a yet further implementation.
Figure 8:
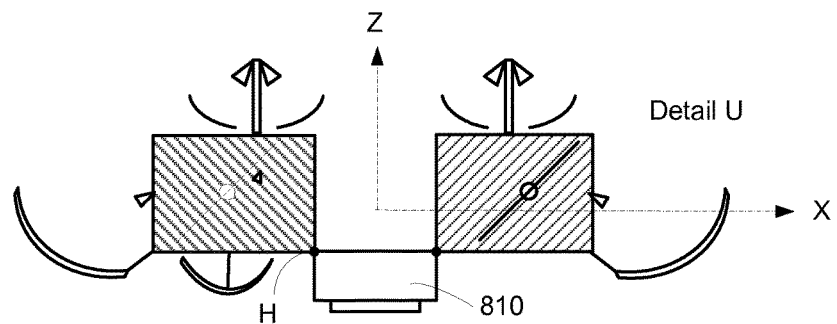

Referring now to FIG. 8, in some implementations a first deployable module 820 and a second deployable module 830 may each be configured in a substantially 'U' shaped configuration. As a result, as may be observed in View A-A, at least a portion of the first deployable module 820 may have a central recess within which an outboard portion of the second deployable module 830 may be disposed in the launch configuration. Similarly, at least a portion of the second deployable module 830 may have a central recess within which an outboard portion of the first deployable module 820 may be disposed. The opening may be closed for protection by a roll-up or fold-up sheet structure deployed after the modules are moved away from each other.

In some implementations the spacecraft contemplated by the presently disclosed techniques may include provisions for controlling drift in orbit. In a geo-synchronous orbit, inclination is controlled by performing periodic north-south stationkeeping (NSSK) maneuvers. The same maneuvers may accomplish east-west stationkeeping (EWSK), which may include eccentricity control, by tilting the thrust vector slightly away from north-south. In the absence of the presently disclosed techniques, in order to reduce impingement of thruster plume onto solar arrays, thrusters for stationkeeping have been conventionally located proximate to an anti-earth portion of the spacecraft. In order to develop a thrust vector through the spacecraft center of mass the thrusters often must be canted by an angle ("cant angle") of 30° or more away from the north-south direction. As a result, efficiency of NSSK maneuvers is reduced by the cosine of the cant angle and because the thrusters produce a substantial undesirable component of thrust in the Z axis (earth/anti-earth) direction in addition to the desired N/S direction.

Referring now to FIGS. 9A-9E, examples are illustrated of arrangements whereby at least one thruster, which may be chemical or high specific impulse electric thrusters, for example, may be configured to develop a thrust vector approximately through the spacecraft center of mass that has little or no cant angle with respect to north-south for a NSSK maneuver or a NSSK-EWSK combined maneuver. In some implementations the thrusters may be coupled with the spacecraft, and articulable by way of a thruster support mechanism (TSM) with at least one degree-of-freedom. An example of TSM is disclosed in U.S. utility patent application Ser. No. 14/580,063, assigned to the assignee of the present application and incorporated herein by reference in its entirety. A TSM may be articulable over a range of positions and orientations such that the at least one thruster may be selectably disposed so as to impart to the spacecraft a velocity change, a torque, or both for a selected one or both of orbit control and momentum management. The thrust vector may intentionally miss the center of mass by a selected small offset, which can be approximately zero if momentum management is not required. Depending on the mission requirements and degrees of freedom in the TSM, some implementations only need one thruster to accomplish NSSK, or both NSSK and EWSK. Dual redundancy is customary, while a single thruster and a single TSM is required for operation. In some implementation with limitations in TSM(s), two thrusters and possibly two TSMs may be needed to produce the desired thrust vector. If a dedicated EWSK maneuver is required, the TSM(s) may swing the thruster(s) outboard (not illustrated) and rotate the thruster to the X direction, with possibly an angle toward the Z direction to reduce plume impingement on solar arrays or reflectors.

FIG. 9A illustrates an example of a spacecraft 9100 that incorporates one or more electric thrusters 907. In the illustrated implementation each of two thruster support mechanisms 908 is arranged to support a respective one or more electric thrusters 907. The launch configuration and the on-orbit configuration of the spacecraft 9100 may be generally similar to the corresponding configurations of spacecraft 100 illustrated in FIG. 1, or 200 in FIG. 2. Similarly, FIG. 9B illustrates an example of a spacecraft 9300 including electric thrusters 907 and thruster support mechanisms 908 where the launch configuration and the on-orbit configuration of the spacecraft 9300 may be generally similar to the corresponding configurations of spacecraft 300 illustrated in FIG. 3 or 400 in FIG. 4. Thruster plume on the solar arrays is reduced when the distance between the solar array rotation axes is increased.

Figure 9C:
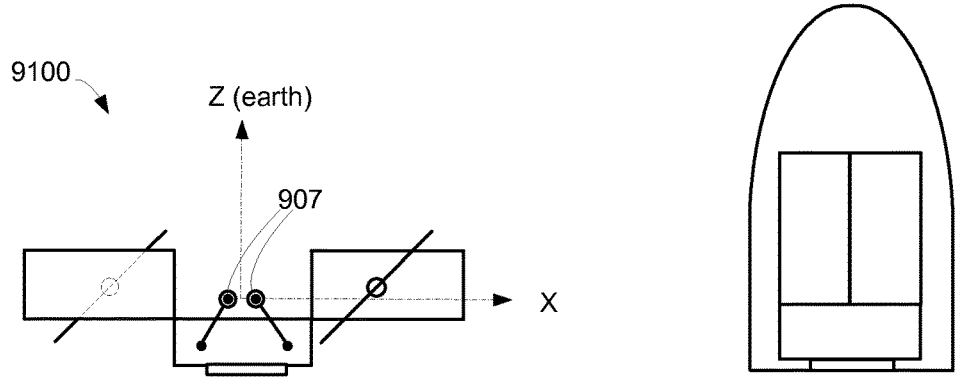
Figure 9C:
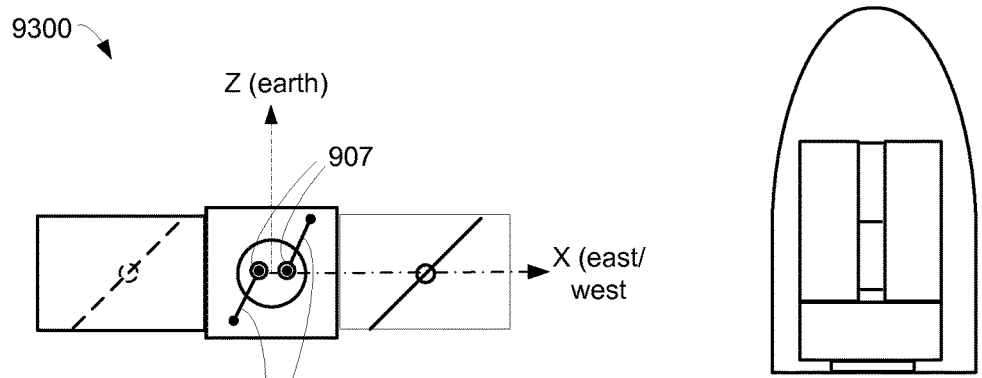
Figure 9C:
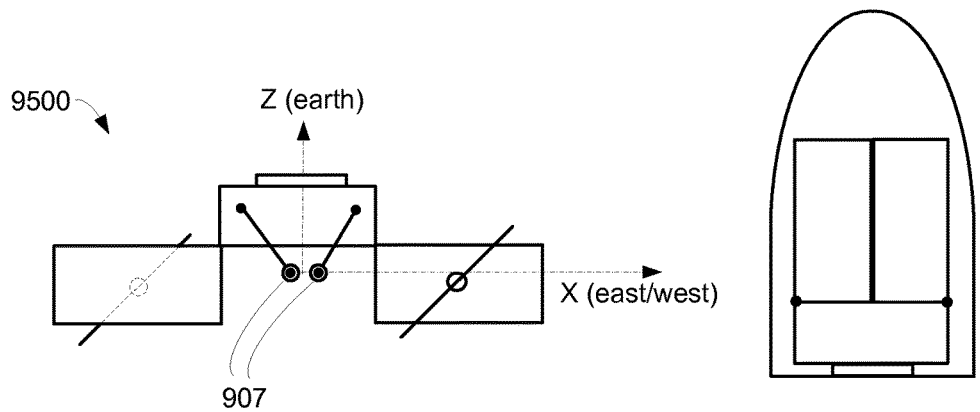

FIG. 9C illustrates an example of a spacecraft 9500 including electric thrusters 907 and thruster support mechanisms 908 where the launch configuration and the on-orbit configuration of the spacecraft 9500 may be generally similar to the corresponding configurations of spacecraft 500 illustrated in FIG. 5.

Figure 9D:
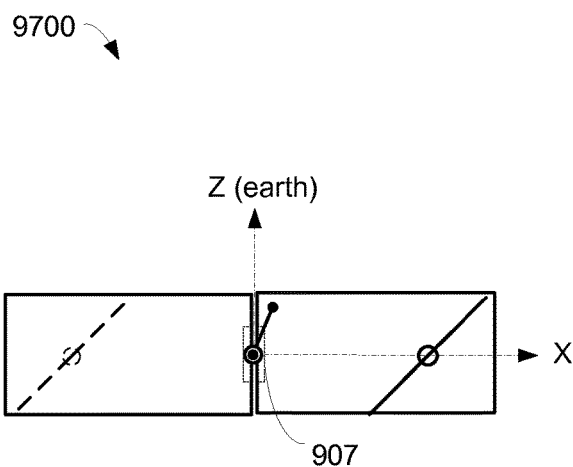
Figure 9D:
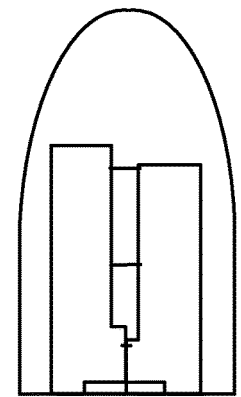

FIG. 9D illustrates an example of a spacecraft 9700 including electric thrusters 907 and thruster support mechanisms 908 where the launch configuration and the on-orbit configuration of the spacecraft 9700 may be generally similar to the corresponding configurations of spacecraft 700 illustrated in FIG. 7.

Figure 9E:
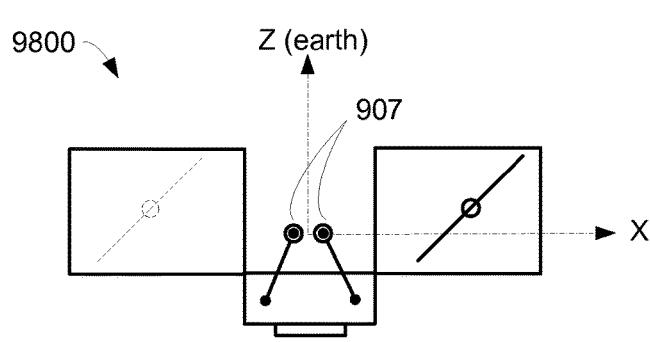
Figure 9E:
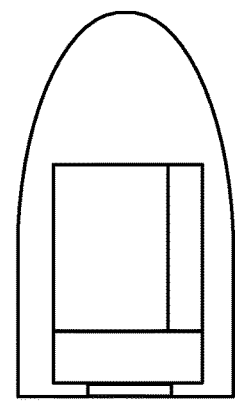

FIG. 9E illustrates an example of a spacecraft 9800 including one or more electric thrusters 907 and thruster support mechanisms 908 where the launch configuration and the on-orbit configuration of the spacecraft 9800 may be generally similar to the corresponding configurations of spacecraft 800 illustrated in FIG. 8. For configurations in which a central structural portion is omitted, at least one of the deployable modules includes a thruster, a tank, and other propulsion hardware. The thrust vector is still very efficient along the NS direction. Without a central structural portion, each of the two modules can be longer than possible in FIG. 3, for example, along the X direction thereby allowing a large distance between the solar array rotation axes. If a linear separation between the modules is implemented as described in the discussion of FIG. 7, the distance between the solar array axes can be further increased.

Additional configurations of thruster are possible (not illustrated). For example, electric thrusters can be placed at the far ends of the deployable modules. At least one propellant tank is in each module. At least two thrusters per spacecraft are needed for a thrust vector through or near the center of mass.

Thus, a high capacity spacecraft with deployable modules has been disclosed. The foregoing merely illustrates principles of the invention. It will thus be appreciated that those skilled in the art will be able to devise numerous systems and methods which, although not expressly shown or described herein, embody said principles of the invention including their combinations and permutations, and are thus within the spirit and scope of the invention as defined by the following claims.

What is claimed is:

1. A spacecraft comprising:
   a first deployable module and a second deployable module, the spacecraft being reconfigurable from a launch configuration to an on-orbit configuration; wherein:
   in the launch configuration, the first deployable module is adjacent to the second deployable module;
   with respect to an orbit plane, in the on orbit configuration, the spacecraft has a yaw (Z) axis within the orbital plane and directed from a spacecraft coordinate system origin toward nadir, a pitch (Y) axis orthogonal to the orbit plane and passing through the spacecraft coordinate system origin, and a roll (X) axis orthogonal to the Y axis and the Z axis and passing through the spacecraft coordinate system origin;
   the first deployable module includes a first solar array, the first solar array being rotatable, in the on-orbit configuration, about a first axis of rotation parallel to the Y-axis, and the second deployable module includes a second solar array, the second solar array being rotatable, in the on-orbit configuration, about a second axis of rotation parallel to the Y-axis, the second axis of rotation being separated by a substantial distance, in a direction transverse to one or both of the first axis and the second axis, from the first axis of rotation; and
   in the on-orbit configuration, neither the first solar array nor the second solar array cross a plane defined by the X axis and the Z axis.

2. The spacecraft of claim 1, further comprising a central structural portion, wherein:
   in the launch configuration, both the first deployable module and the second deployable module are disposed forward of the central structural portion; and
   in the on orbit configuration, the central structural portion is disposed approximately between the first deployable module and the second deployable module.

3. The spacecraft of claim 2, wherein one or both of the first deployable module and the second deployable module is hingedly coupled with the central structural portion.

4. The spacecraft of claim 2, wherein one or both of the first deployable module and the second deployable module is slidably coupled with the central structural portion.

5. The spacecraft of claim 1, wherein a transition between the launch configuration and the on orbit configuration includes a rotary motion of one or both of the first deployable module and the second deployable module.

6. The spacecraft of claim 1, wherein a transition between the launch configuration and the on orbit configuration includes a linear motion of one or both of the first deployable module and the second deployable module.

7. The spacecraft of claim 1, wherein reconfiguring from the launch configuration to the on-orbit configuration includes imparting relative motion to the first deployable module and the second deployable module, an initial direction of the relative motion being substantially orthogonal to adjacent surfaces of the first deployable module and the second deployable module.

8. The spacecraft of claim 1, wherein reconfiguring from the launch configuration to the on-orbit configuration includes imparting a relative motion to the first deployable module and the second deployable module, an initial direction of the relative motion being substantially parallel to adjacent surfaces of the first deployable module and the second deployable module.

9. The spacecraft of claim 1, wherein,
   reconfiguring from the launch configuration to the on-orbit configuration includes imparting relative motion to the first deployable module and the second deployable module whereby an effective length of the spacecraft along the roll axis is increased.

10. The spacecraft of claim 9, wherein:
    at least one of the first deployable module and the second deployable module includes a first sidewall area and a third sidewall area substantially disposed, in the on-orbit configuration, orthogonal to the pitch axis and facing toward opposite directions; and a second sidewall area and a fourth sidewall area substantially disposed, in the on-orbit configuration, respectively, orthogonal to the roll axis; and
    a first combined area of the first sidewall area and the third sidewall area is substantially larger than a second combined area of the second sidewall area and the fourth sidewall area.

11. The spacecraft of claim 10, wherein the first combined area is at least two times as large as the second combined area.

12. The spacecraft of claim 1, wherein each of the first deployable module and the second deployable module includes a respective payload element.

13. The spacecraft of claim 1, wherein
    at least a portion of each the first deployable module and the second deployable module has a substantially 'U' shaped configuration, including a central recess, and two outboard segments; and
    at least one outboard segment of the first deployable module is disposed, in the launch configuration, within the central recess of the second deployable module.

14. The spacecraft of claim 1, wherein:
    the spacecraft includes an aft surface including a launch vehicle adapter; and
    in the on orbit configuration, the spacecraft is oriented with the aft surface and at least one payload element disposed so as to be Earth facing.

15. The spacecraft of claim 1, wherein:
    the spacecraft includes an aft surface including a launch vehicle adapter; and
    in the on orbit configuration, the spacecraft is disposed such that a normal to the aft surface is substantially parallel to the first axis of rotation.

16. The spacecraft of claim 1, wherein:
    pressure due to solar radiation impingement on the first deployable module and the second deployable module results in approximately balanced solar torque.

17. The spacecraft of claim 1, further comprising at least one thruster, wherein:

the spacecraft has a center of mass and the at least one first thruster is configured to produce a thrust vector passing through or proximate to the center of mass the thrust vector being approximately parallel to the first axis of rotation.

18. The spacecraft of claim 17, further comprising a thruster support mechanism (TSM) with one or more degrees-of-freedom, wherein the TSM is articulable over a range of positions and orientations such that the at least one thruster may be selectably disposed so as to impart to the spacecraft a velocity change, a torque, or both for a selected one or both of orbit control and momentum management.

19. The spacecraft of claim 1, further comprising a launch vehicle adapter, wherein the first deployable module includes a first portion of the launch vehicle adapter, and the second deployable module includes a second portion of the launch vehicle adapter.

20. The spacecraft of claim 19, wherein, in the on-orbit configuration, the first deployable module and the second deployable module are non-abutting.

* * * * *